US 6,715,813 B2

(12) United States Patent
Thompson et al.

(10) Patent No.: US 6,715,813 B2
(45) Date of Patent: Apr. 6, 2004

(54) OVER-CENTER SPRING CONTROL

(75) Inventors: Joseph M. Thompson, Holland, MI (US); Paul C. Schutter, Kent City, MI (US); John A. Hall, Holland, MI (US)

(73) Assignee: Johnson Controls Technology, Plymouth, MI (US)

( * ) Notice: Subject to any disclaimer, the term of this patent is extended or adjusted under 35 U.S.C. 154(b) by 0 days.

(21) Appl. No.: 10/224,223

(22) Filed: Aug. 20, 2002

(65) Prior Publication Data

US 2004/0036304 A1 Feb. 26, 2004

(51) Int. Cl.$^7$ ................................................. B60N 3/02
(52) U.S. Cl. .......................... 296/1.02; 16/438; 16/445
(58) Field of Search ............................... 296/1.02, 210, 296/214; 16/110.1, 444, 445, 438

(56) References Cited

U.S. PATENT DOCUMENTS

| 5,105,521 A | * | 4/1992 | Dowd et al. ................. 29/453 |
| 5,625,921 A | | 5/1997 | Smith |
| 5,975,606 A | * | 11/1999 | Forbes et al. ............. 296/1.02 |
| 6,095,469 A | * | 8/2000 | Von Alman ................. 248/304 |
| 6,397,435 B1 | * | 6/2002 | Gosselet ....................... 16/438 |
| 6,467,130 B2 | * | 10/2002 | Kurachi et al. ............... 16/438 |
| 6,616,222 B1 | * | 9/2003 | Ponceau ..................... 296/214 |
| 2002/0020250 A1 | * | 2/2002 | Sakuma et al. ............ 74/551.9 |
| 2003/0074767 A1 | * | 4/2003 | Chang ......................... 16/438 |

* cited by examiner

Primary Examiner—D. Glenn Dayoan
Assistant Examiner—Patricia L. Engle
(74) Attorney, Agent, or Firm—Price, Heneveld, Cooper, DeWitt & Litton

(57) ABSTRACT

An arcuate spring is coupled between a fixed vehicle member and a movable vehicle member with a pivot connection between the members interposed between the ends of the spring such that, as the movable member is moved from a first position, the axis of the pivot connection is located outside of a line intersecting the ends of the spring, thereby holding the movable member in a first position. When the movable member is moved to a second position, the pivot connection lies between the spring and a line connecting the end points of the spring to provide a bias force which holds the movable member in a second position. In one embodiment, the over-center spring is integrated with a grab handle for holding the grab handle in a deployed or retracted position. In another embodiment, the spring is associated with a vehicle panel.

13 Claims, 4 Drawing Sheets

OVER-CENTER SPRING CONTROL

BACKGROUND OF THE INVENTION

The present invention relates to a control for vehicle accessories and particularly an over-center spring control for holding a panel or grab handle in first or second positions.

Frequently, vehicle panels, such as doors, include latches for holding them in an open position and a separate latch for holding them in a closed position. Vehicle grab handles, on the other hand, are typically spring-biased in a stored or retracted position. One proposal for a vehicle grab handle integrally includes coat hooks as, for example, disclosed in U.S. Pat. No. 5,625,921. With such a grab handle design, integral clothes hooks are provided to allow the grab handle to perform multiple functions, namely, the normal grab handle use but in addition it can be used for hanging articles. One difficulty with the use of such a grab handle which is biased in a normally retracted position is that it is somewhat difficult to hang articles thereon since the grab handle is not visible from the exterior of the vehicle when an individual standing outside of the vehicle is attempting to hang clothing on the hooks associated with the handle.

It would be desirable, therefore, to have a grab handle with integrated coat hooks which can be deployed from a stored to a use position and remain in the deployed use position such that it is readily visible to the user, who then can easily hang articles on the coat hooks. With other vehicle accessories, such as door panels, storage compartments and the like, it would also be desirable to have a door which does not require multiple latches or camming structure for holding the doors in open and closed positions, respectively.

SUMMARY OF THE INVENTION

The over-center spring control of the present invention satisfies these needs by providing an arcuate shaped spring which is coupled between a fixed vehicle member and a movable vehicle member with a pivot connection between the fixed and movable members interposed between the ends of the spring such that, as the movable vehicle member is moved from a first position, the axis of the pivot connection is located outside of a line intersecting the ends of the spring, thereby holding the movable member in a first position. When the movable member is moved to a second position, the pivot connection lies between a line connecting the end points of the spring and the spring, such that the spring provides a bias force which tends to hold the movable member in a second position pivotally displaced from the first position.

Thus, by providing an arcuate spring, the ends of the spring move over-center of the pivot connection of the movable member with the fixed member in a closed and an open position, thereby providing a bias force for urging and holding the member in each of the positions. In one embodiment of the invention, such an over-center spring is integrated with a grab handle for holding the grab handle in a deployed position or a retracted position. In a preferred embodiment of the invention, the grab handle integrally includes a coat hook for holding objects thereon. In yet another embodiment of the invention, the spring is associated with a vehicle panel and, in a specific embodiment, a storage unit having panels which are moved between flat, substantially flush positions to vertically extended use positions. A spring is associated with the movable panels in relationship to the pivot connection of the panels to a floor of the unit to provide held-open and held-closed positions.

In any embodiment of the invention, the spring may be associated and aligned with the pivot connection along the longitudinal axis of the spring, or, in other embodiments, the hinges can be positioned in laterally spaced relationship to the spring connection so long as a line intersecting the ends of the arcuate spring to the fixed and movable members move from one side of the pivot axis of the movable element to the other side of the pivot axis of the movable element for holding the movable element in first and second spring biased positions. Such construction provides a greatly reduced cost of construction by reducing the number of parts. It also provides a reliable operating system in view of the elimination of costly elements which may be prone to failure, and a control system which allows variability in the bias force provided depending on the spring size provided. Thus, the control may be used with grab handles, relatively small accessory doors or panels, or with relatively large cargo-holding compartment panels.

These and other features, objects and advantages of the present invention will become apparent upon reading the following description thereof together with reference to the accompanying drawings.

DETAILED DESCRIPTION OF THE PREFERRED EMBODIMENTS

Figure 1:
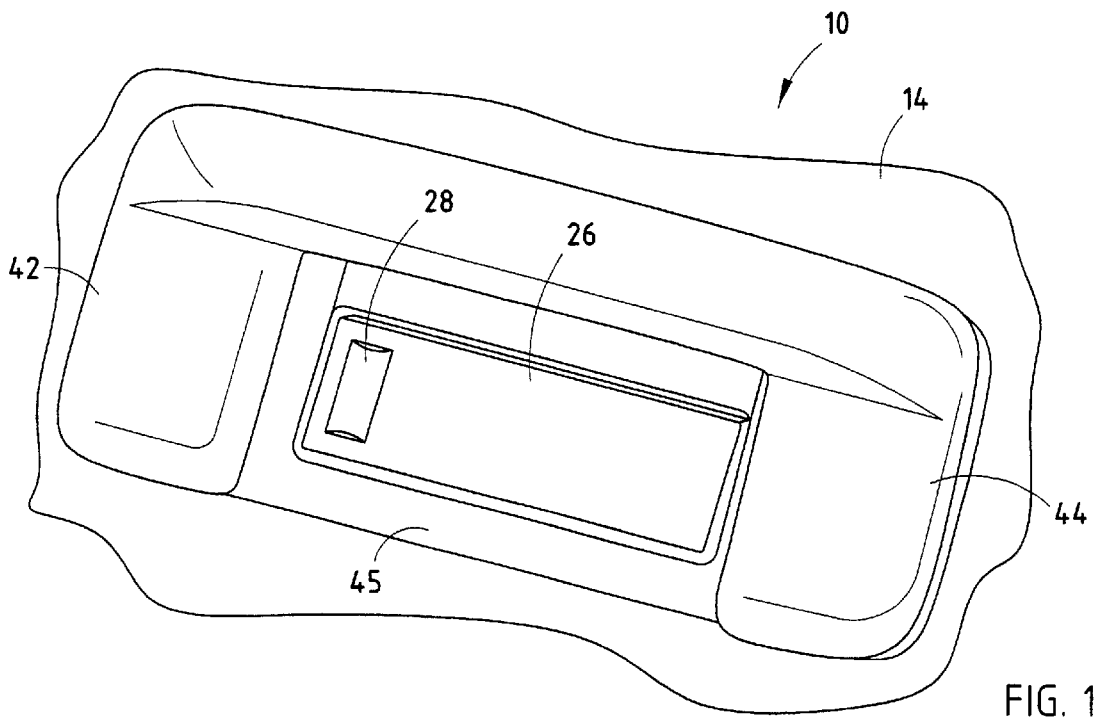
FIG. 1 is a fragmentary perspective view of a vehicle grab handle assembly utilizing the spring control of the present invention, shown with the grab handle assembly in a spring-biased retracted or stored position.
Figure 2:
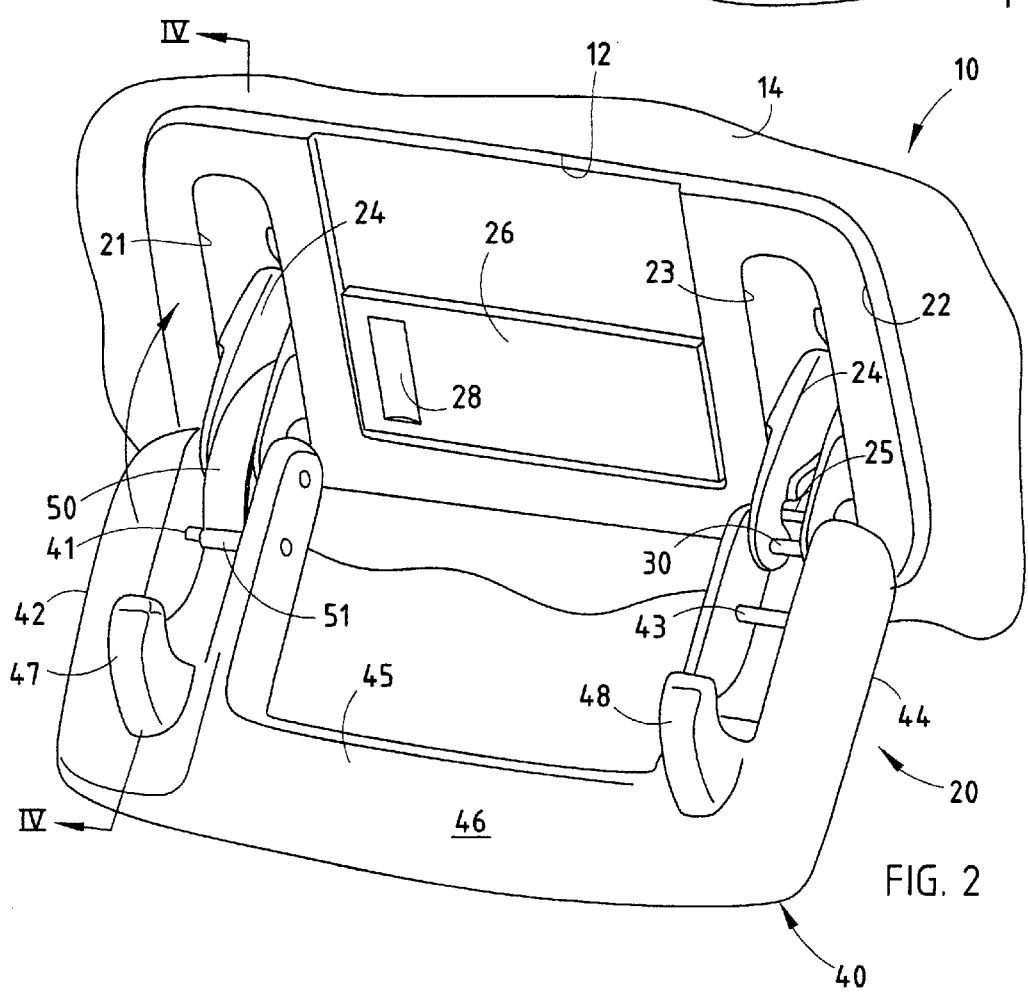
FIG. 2 is a fragmentary perspective view of the grab handle assembly of FIG. 1, shown in its spring-biased, deployed open position.
Figure 3:
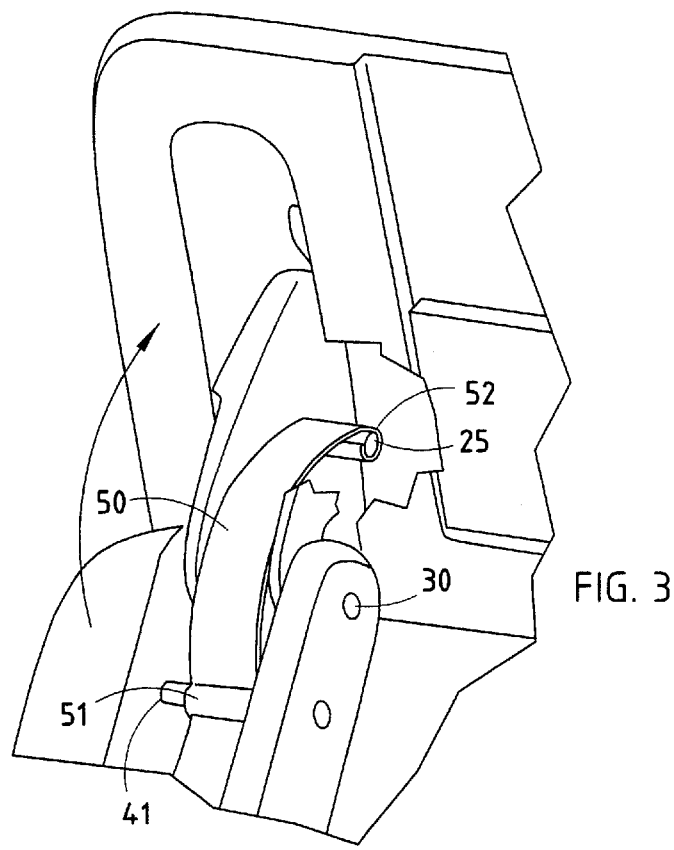
FIG. 3 is an enlarged fragmentary perspective view of one of the springs and hinges of the grab handle shown in FIG. 2.
Figure 4:
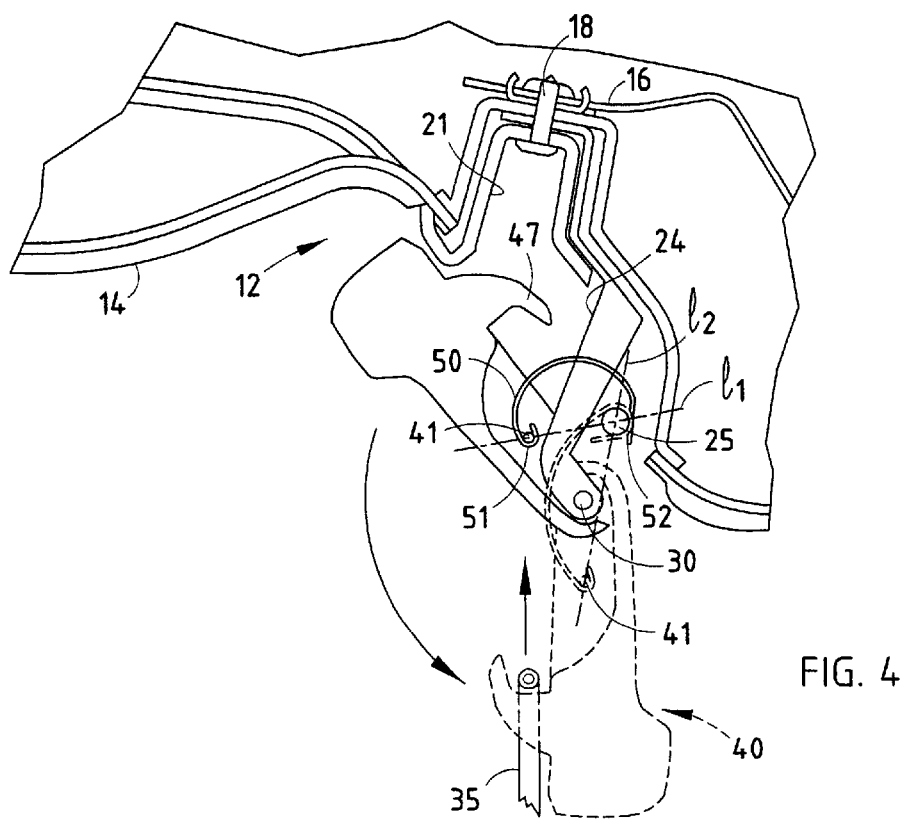
FIG. 4 is a vertical cross-sectional view of the grab handle shown in FIGS. 1–3, taken along section lines IV—IV of FIG. 2 and illustrating, in phantom and solid lines, the operation of the spring control.

Referring initially to FIGS. 1–4, there is shown an interior section of a vehicle 10, such as an automobile, sports utility vehicle, van, truck or the like, which includes a grab handle assembly 20 suitably mounted to the underlying roof support 16 (FIG. 4) of the vehicle in a recess 12 in headliner 14. The grab handle assembly includes a bezel 22 which is secured to the underlying sheet metal structure 16 of the roof by suitable fasteners 18 located in recesses 21 and 23 of bezel 22. Bezel 22 is integrally molded of a suitable polymeric material and integrally includes a pair of arms 24 which extend outward slightly from recesses 21 and 23 and terminate at ends which include a pivot pin 30 to which the legs 42 and 44 of a generally U-shaped grab handle 40 are pivotally mounted by means of the pivot pins 30 extending through the ends of legs 42, 44 and the end of arms 24 integrally formed in bezel 22. Thus, pins 30 define the pivot connection between the movable member (i.e. grab handle 40) and the fixed member (i.e. bezel 22) of the vehicle. The bezel may also include a central area with a lamp assembly including a diffusing lens 26 behind which there is mounted a lamp (not shown) and an actuator switch 28 for directing illumination outwardly from the grab handle assembly 20 so formed. Each of the legs 42, 44 are coupled by an integrally molded cross member 45 of grab handle 40, which integrally includes on the inner-facing side 46 thereof a pair of integrally molded coat hooks 47 and 48 for receiving clothes hangers 35, as seen in FIG. 4, when in a deployed position, as shown in FIG. 2 and in phantom in FIG. 4.

Surrounding pivot pin 30 for each of the legs 42, 44 of grab handle 20 is an arcuate spring 50 (one shown in FIG. 2) which has hook-forming ends 51 and 52. As seen in solid lines in FIGS. 2 and 4, one curved end 51 of spring 50 is rotatably hooked around a mounting post 41 of arm 42 with arm 44 including a similar mounting post 43 for an associated spring (not shown for the purposes of illustrating the structure of the arms and connection points for spring 50). The opposite end 52 of spring 50 is rotatably extended over a fixed mounting post 25 of bezel 22 at a location behind arms 24. Thus, spring 50 is curved to surround the pivot connection 30, and the ends 51 and 52 anchor the spring to the respective mounting posts 25 and 41, with post 41 being movable with respect to post 25 as grab handle 40 is moved from a stored position, shown in FIG. 1, to a deployed position, shown in FIG. 2.

The operation of the arcuate spring 50 is best seen with reference to FIG. 4 in which it is seen that ends 51, 52 of spring 50 hold the grab handle in either a closed position, as shown in solid lines in FIG. 4, or a biased open position, as shown in phantom lines in FIG. 4. When in a closed position, a line l1 passing through the ends 51, 52 of spring 50 lies on one side of pivot pin 30, such that the compressive force of arcuate spring 50, which is inwardly of ends 51 and 52, tends to hold element 41 as close as possible to connection 25, thereby biasing the pivoted grab handle 40 in the closed position shown in solid lines in FIG. 4. As the grab handle is moved to an open position, illustrated in phantom lines in FIG. 4, by pivoting the U-shaped arm about pivot pins 30, the spring 50 is urged to a more open, flattened position with ends 51, 52 now lying in a line l2 which is on a side opposite pivot connection 30 such that the compressive force of ends 51, 52 of spring 50, which tend to move toward one another, now lies on an opposite side of the pivot connection 30 and spring 50 holds the grab handle 40 in the open position seen in FIG. 2 and in phantom form in FIG. 4. Thus, spring 50 operates as an over-center spring by moving its ends from a position along one side of the pivot connection of the moveable element to the fixed element to a side opposite the pivot connection between the two elements for holding the movable element, such as grab handle 40, either in a closed first position or an open second position.

In the embodiment of FIGS. 1–4, it is seen that the arcuate spring 50 is aligned laterally to substantially overlay the pivot connection 30. This alignment, however, is not necessary as seen in an alternative embodiment of the invention shown in FIGS. 5–8. Spring 50 in one embodiment had a width of from about 8 mm to about 10 mm and was made of spring steel suitably treated for use in the automotive environment. As seen in solid lines, spring 50 circumscribes an arc slightly greater than 180° when in the first position in which the spring ends 51, 52 are under compression. The dimensions of spring 50 can be varied as necessary depending upon the size and shape of the grab handle 40.

Figure 5:
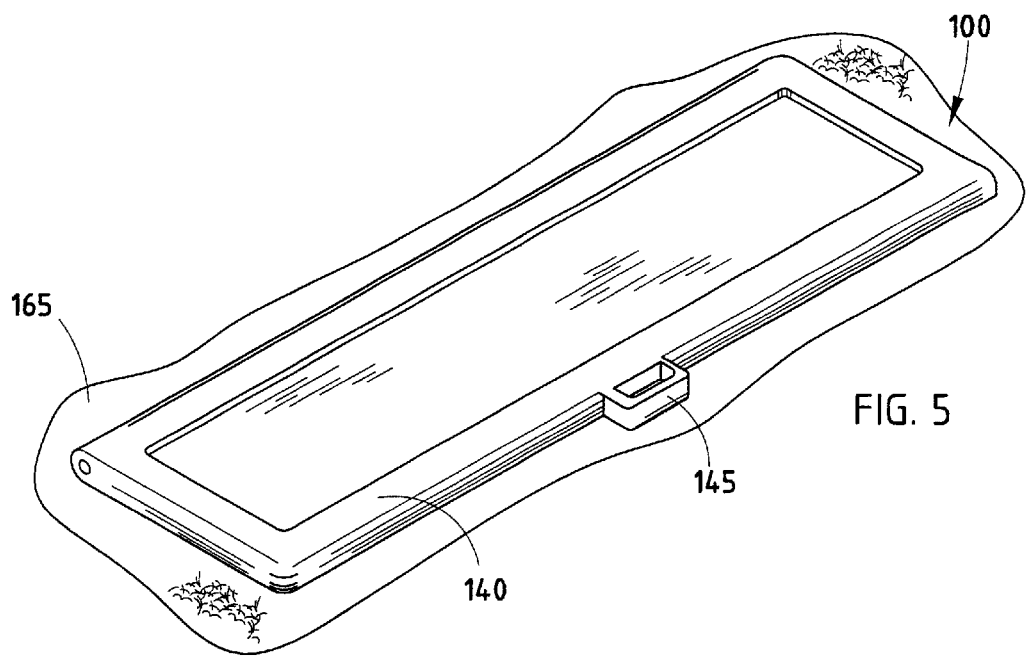
FIG. 5 is a vehicle storage area with a storage compartment shown in a collapsed position and embodying a spring control of the present invention.
Figure 6:
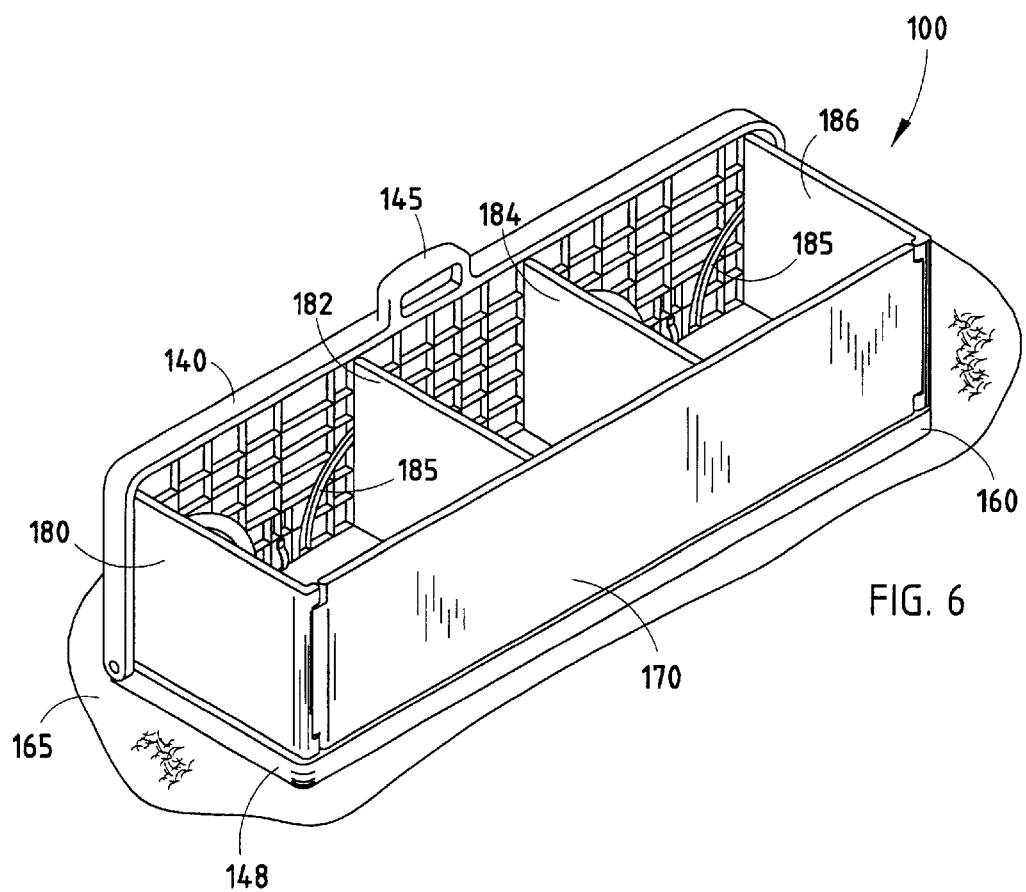
FIG. 6 is a fragmentary perspective view of a vehicle storage area, with the storage compartment shown in FIG. 5 shown in an open position for use.
Figure 7:
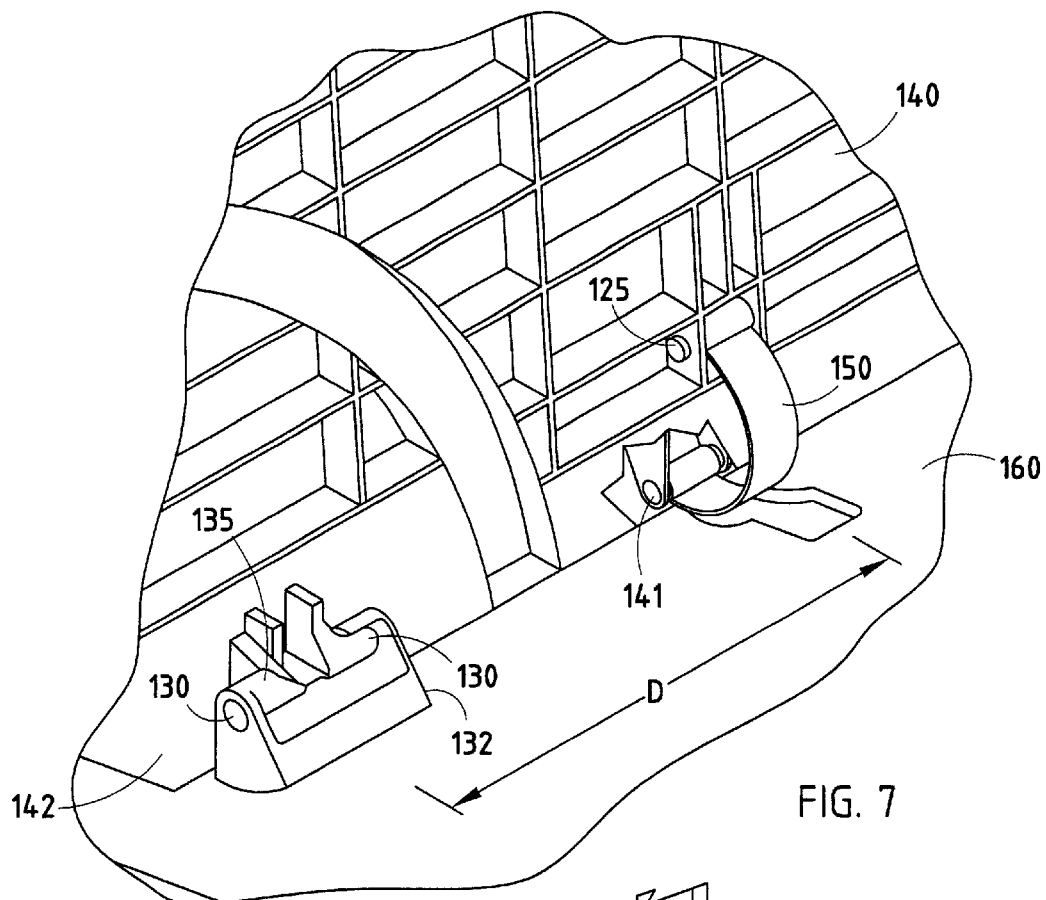
FIG. 7 is an enlarged fragmentary perspective view of a hinge and spring control assembly employed with the storage compartment shown in FIGS. 5 and 6.

Another application of the spring control of the present invention is shown in FIG. 5–8 where similar or corresponding structural elements to those of the first embodiment are similarly numbered with "1" preceding the reference number. As best seen in FIG. 7, an arcuate spring 150 has a first end 151 coupled to pin 125 of movable element 140 comprising a panel 140 of a storage bin 100, shown in a collapsed or closed position in FIG. 5 and an open use position shown in FIG. 6. The opposite end 152 of spring 150 is coupled to a pin 141 of fixed member 160 comprising the floor or base of storage bin 100. The spaced-apart arcuate springs 150 associated with the movable panel 140 forming the cover for storage bin 100 are laterally spaced a distance D in FIG. 7 from the pivot connection of panel 140 and base 160. A mounting boss 132 on base 160 receives pivot pins 130 extending from an edge 142 of panel 140 which snap-fit in the resilient polymeric sockets 135 formed in base 132 in laterally spaced relationship to the mounting of over-center springs 150.

Figure 8:
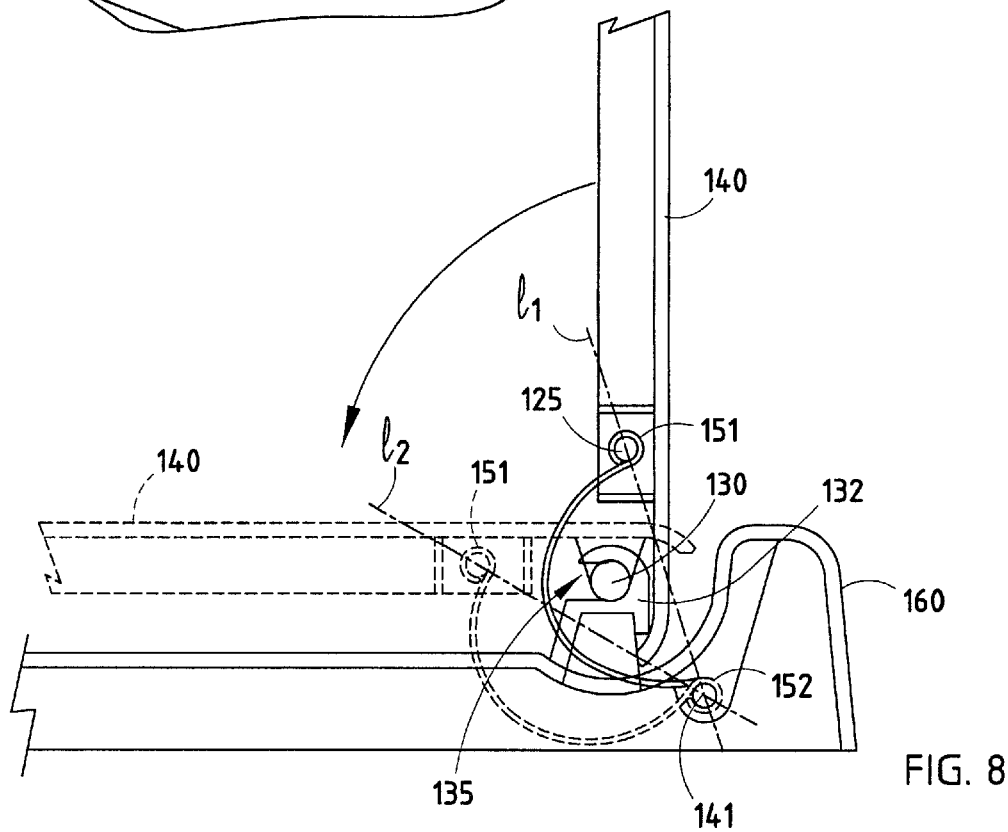
FIG. 8 is a vertical cross-sectional view illustrating, in phantom and solid lines, the operation of the hinge and spring control shown in FIG. 7.

Panel 140 is mounted to base 160 by a plurality of spaced-apart pins, socket connectors, and associated springs. As seen in FIG. 8, panel 140 moves between a position in which line l1 lies on one side of the pivot connection 130 between panel 140 and base 160 to urge the panel 140 in an open position, as seen in solid lines in FIG. 8. Panel 140 can be moved to a second position in which line l2 between the ends 141 and 151 of spring 150 lie on the opposite side of pivot connection 130 to urge panel 140 to a closed position, as shown in phantom lines in FIG. 8.

The storage bin 100, as seen in FIGS. 5 and 6, typically will be mounted to a floor 165 of a vehicle storage area, such as the rear storage compartment of a van, trunk of an automobile, or the like, and includes a base 160 comprising the fixed element which can be secured to the floor 165 of the vehicle. A plurality of spaced mounting springs 150 spaced along the length of panel 140 and multiple spaced pivot pins 130, including mounting bosses 132 and sockets 135, secure panel 140 to base 160 for movement between a closed position, shown in FIG. 5, to an open position shown in FIGS. 6, 7 and 8. The storage bin 100 also includes fold-up panel 170 which can have the same spring and hinge construction as shown in FIG. 7 with respect to panel 140. End and intermediate panels 180, 182, 184, and 186 are pivotally mounted to base 160 to divide the storage bin into separate compartments, as seen in FIG. 6. By the utilization of the over-center springs 150 associated with movable panels 140 and 170 with respect to fixed base 160, latch mechanisms for holding the panels 140 and 170 in a collapsed position, as seen in FIG. 5, are unnecessary as are latching mechanisms for interlocking the intermediate panels 180, 182, 184, and 186, although arcuate guides, such as arcuate slots 185 in panels 140 or 170, may be desirable for receiving tabs extending from panels 180, 182, 184, and 186 for guiding their motion. A handle 145 may be provided at an edge of cover panel 140 which overlies panel 170 when closed to assist in opening the collapsible storage bin. The component panels of bin 100 can be molded of a suitable polymeric material, such as polycarbonate, ABS, or the like.

Although described in connection with the grab handle assembly and a storage bin 100, the arcuate over-center spring controls 50, 150 of the present invention can be used in connection with any pivotally movable element with respect to a fixed element in a vehicle, vehicle panel, or other vehicle accessory for which it is desired to have the movable element move between a deployed held-open position and a held-closed position under the bias force of the over-center spring. In the embodiment shown in FIGS. 5–8, springs 150 will be somewhat larger than those required for the grab handle assembly shown in FIGS. 14 and their dimensions can be selected to provide a desired spring force.

It will become apparent to those skilled in the art that various modifications to the preferred embodiment of the invention as described herein can be made without departing from the spirit or scope of the invention as defined by the appended claims.

What is claimed is:

1. A grab handle and spring control for holding a grab handle which is pivotally mounted to a vehicle in stored or deployed positions comprising:

a grab handle pivotally coupled to a vehicle by a pivot axle having an axis; and an arcuate spring having a first and a second end with said first end coupled to the vehicle and said second end coupled to said grab handle, wherein said spring circumscribes the axis of said pivot axle such that when the grab handle is in a stored position the ends of the arcuate spring lie in a line on one side of the axis to provide a force to the grab handle to hold said grab handle in said stored position and, when the grab handle is moved toward a deployed position, the ends of the spring lie in a line on the opposite side of the axis such that said spring provides a force to hold said grab handle in said deployed position.

2. The control as defined in claim 1 wherein said ends of said spring are curved to couple said spring to said grab handle and said vehicle.

3. The control as defined in claim 2 wherein said grab handle includes a pin around which said second end of said spring extends for rotation around said pin.

4. The control as defined in claim 2 and further including a bezel for mounting said grab handle to said vehicle.

5. The control as defined in claim 4 wherein said bezel includes a pin for rotatably receiving said first end of said spring.

6. The control as defined in claim 5 wherein said bezel includes a socket for snap-in receiving said pivot axle.

7. The control as defined in claim 6 wherein said grab handle includes at least one hook for receiving a coat hanger when said grab handle is deployed.

8. The control as defined in claim 1 wherein said grab handle includes at least one hook for receiving a coat hanger when said grab handle is displayed.

9. The control as defined in claim 1 wherein said spring is aligned to overlay said pivot axle.

10. A grab handle assembly comprising:

a bezel having at least one of a pivot axle and socket;

a grab handle having at least one of the other of a pivot axle and socket for coupling said grab handle to said bezel; and an arcuate spring having a first and a second end with said first end coupled to the bezel and said second end coupled to said grab handle, wherein said spring circumscribes the axis of said pivot axle such that when the grab handle is in a stored position the ends of the arcuate spring lie in a line on one side of the axis to provide a force to the grab handle to hold said grab handle in said stored position and, when the grab handle is moved toward a deployed position, the ends of the spring lie in a line on the opposite side of the axis such that said spring provides a force to hold said grab handle in said deployed position.

11. The control as defined in claim 10 wherein said bezel and grab handle include spring-receiving pins and the ends of said spring are curved to couple said spring to said pins on said grab handle and said bezel.

12. The control as defined in claim 11 wherein said grab handle includes a pivot axle and said bezel includes a socket for snap-in receiving said pivot axle.

13. The control as defined in claim 12 wherein said grab handle includes at least one hook for receiving a coat hanger when said grab handle is deployed.

* * * * *

UNITED STATES PATENT AND TRADEMARK OFFICE
CERTIFICATE OF CORRECTION

PATENT NO. : 6,715,813 B2
DATED : April 6, 2004
INVENTOR(S) : Thompson et al.

It is certified that error appears in the above-identified patent and that said Letters Patent is hereby corrected as shown below:

Column 5,
Line 5, "FIGS 14" should be -- Figs. 1-4 --.

Signed and Sealed this

Twenty-fifth Day of May, 2004

JON W. DUDAS
*Acting Director of the United States Patent and Trademark Office*